US012776519B2

(12) United States Patent
Fukamichi et al.

(10) Patent No.: US 12,776,519 B2
(45) Date of Patent: Oct. 27, 2026

(54) NON-AQUEOUS ELECTROLYTE SECONDARY BATTERY

(71) Applicant: Panasonic Intellectual Property Management Co., Ltd., Kadoma (JP)

(72) Inventors: Noriko Fukamichi, Osaka (JP); Tomohiro Harada, Osaka (JP); Takeshi Ogasawara, Osaka (JP); Daizo Jito, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 729 days.

(21) Appl. No.: 18/037,578

(22) PCT Filed: Nov. 30, 2021

(86) PCT No.: PCT/JP2021/043967
§ 371 (c)(1),
(2) Date: May 18, 2023

(87) PCT Pub. No.: WO2022/114233
PCT Pub. Date: Jun. 2, 2022

(65) Prior Publication Data
US 2023/0411694 A1 Dec. 21, 2023

(30) Foreign Application Priority Data
Nov. 30, 2020 (JP) ................................ 2020-199027

(51) Int. Cl.
*H01M 10/0568* (2010.01)
*H01M 4/36* (2006.01)
(Continued)

(52) U.S. Cl.
CPC ....... *H01M 10/0568* (2013.01); *H01M 4/364* (2013.01); *H01M 4/483* (2013.01);
(Continued)

(58) Field of Classification Search
None
See application file for complete search history.

(56) References Cited

U.S. PATENT DOCUMENTS 4,980,080 A 12/1990 Lecerf et al.
2008/0093581 A1 * 4/2008 Peres .................... C01G 53/42
252/182.1

(Continued)

FOREIGN PATENT DOCUMENTS

CN 109244438 A 1/2019
JP 2-040861 A 2/1990

(Continued)

OTHER PUBLICATIONS

Office Action dated Jul. 21, 2023, issued in counterpart IN application No. 202347035391. (7 pages).

(Continued)

*Primary Examiner* — Brian R Ohara
*Assistant Examiner* — M. T. Leonard
(74) *Attorney, Agent, or Firm* — WHDA, LLP

(57) ABSTRACT

This non-aqueous electrolyte secondary battery, which is one example of an embodiment, comprises: a positive electrode that has a positive electrode mixture layer; a negative electrode; and a non-aqueous electrolyte. The positive electrode mixture layer contains a first lithium-and-transition-metal composite oxide represented by general formula $Li_xNi_{1-y-z}Co_yM_zO_2$ (in the formula, $0.8 \leq x \leq 1.2$, $0 \leq y \leq 0.2$, $0 < z \leq 0.5$, and M is at least one metal element excluding Li, Ni, and Co), and a second lithium-and-transition-metal composite oxide represented by general formula $Li_aNi_{2-a-b}Me_bO_2$ (in the formula, $0 < a \leq 0.5$, $0 \leq b \leq 0.5$, and Me is at least one metal element excluding Li and Ni). The non-aqueous electrolyte contains a sulfonyl imide salt.

5 Claims, 2 Drawing Sheets

(51) Int. Cl.

| | |
|---|---|
| ***H01M 4/48*** | (2010.01) |
| ***H01M 4/525*** | (2010.01) |
| ***H01M 4/587*** | (2010.01) |
| ***H01M 10/0525*** | (2010.01) |

(52) U.S. Cl.

CPC ........... *H01M 4/525* (2013.01); *H01M 4/587* (2013.01); *H01M 10/0525* (2013.01); *H01M 2300/0025* (2013.01)

(56) References Cited

U.S. PATENT DOCUMENTS

| | | | | |
|---|---|---|---|---|
| 2009/0035659 | A1 | 2/2009 | Takeuchi et al. | |
| 2010/0209771 | A1 | 8/2010 | Shizuka et al. | |
| 2011/0129734 | A1* | 6/2011 | Konishi | H01M 10/0525 429/223 |
| 2017/0214044 | A1* | 7/2017 | Huang | C01G 53/52 |
| 2018/0254482 | A1* | 9/2018 | Matsuu | H01M 4/131 |
| 2019/0280284 | A1* | 9/2019 | Azami | H01M 4/525 |
| 2019/0280300 | A1 | 9/2019 | Maeda et al. | |

FOREIGN PATENT DOCUMENTS

| | | | |
|---|---|---|---|
| JP | 4781004 | B2 | 9/2011 |
| JP | 5359140 | B2 | 12/2013 |
| JP | 2018-035057 | A | 3/2018 |

OTHER PUBLICATIONS

Wang et al., "Simple rapid and accurate determination of lattice composition and evaluation of electrochemical properties of LixNi2-xO2 electrode material for lithium ion battery by a novel method", Electrochemistry Communications, 2006, vol. 8, pp. 289-292, cited in ISR. (4 pages).

International Search Report dated Jan. 25, 2022, issued in counterpart International Application No. PCT/JP2021/043967, with English translation. (5 pages).

* cited by examiner

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2021/043967 filed on Nov. 30, 2021, which claims the benefit of priorities under 35 U.S.C. § 119(a) of Japanese Patent Application No. 2020-199027 filed in Japan on Nov. 30, 2020, the contents of which are incorporated herein by reference.

TECHNICAL FIELD

The present disclosure generally relates to a non-aqueous electrolyte secondary battery.

BACKGROUND ART

A non-aqueous electrolyte secondary battery comprises a positive electrode, a negative electrode, a separator interposed between the positive electrode and the negative electrode, and a non-aqueous electrolyte, and has a structure in which these components are housed in an exterior. Since a constitution of the positive electrode, which is a major constituent of the non-aqueous electrolyte secondary battery, significantly affects battery characteristics including charge-discharge cycle characteristics, there have been many investigations on the positive electrode. For example, Patent Literatures 1 and 2 disclose a positive electrode active material for the purpose of improvement of performance such as charge-discharge cycle characteristics.

The positive electrode active material disclosed in Patent Literature 1 is a composite oxide represented by the general formula $Li_xNi_{1-y-z-v-w}Co_yAl_zM1_vM2_wO_2$, wherein the element M1 represents at least one selected from the group consisting of Mn, Ti, Y, Nb, Mo, and W, the element M2 represents at least two selected from the group consisting of Mg, Ca, Sr, Ba, and Ra, and the element M2 includes at least Mg and Ca.

The positive electrode active material disclosed in Patent Literature 2 is a composite oxide represented by $[L]_{3a}[M]_{3b}[O_2]_{6c}$ (L=Li, and M=Ni, Mn, and Co, or Li, Ni, Mn, and Co), and includes greater than or equal to 0.1 mol % and less than or equal to 5 mol % of one or more elements selected from Mo, W, Nb, Ta, and Re relative to a total molar amount of Mn, Ni, and Co.

CITATION LIST

Patent Literature

PATENT LITERATURE 1: Japanese Patent No. 4781004
PATENT LITERATURE 2: Japanese Patent No. 5359140

SUMMARY

Technical Problem

With the spread of the non-aqueous electrolyte secondary battery for on-board use, power storage use, and the like, the non-aqueous electrolyte secondary battery is required to have further higher performance, specifically improvement of charge-discharge cycle characteristics. Conventional art including the art of Patent Literatures 1 and 2 still has room for improvement of cycle characteristics.

Solution to Problem

A non-aqueous electrolyte secondary battery according to the present disclosure comprises: a positive electrode having a positive electrode mixture layer; a negative electrode; and a non-aqueous electrolyte, wherein the positive electrode mixture layer includes: a first lithium-transition metal composite oxide represented by the general formula $Li_xNi_{1-y-z}Co_yMzO_2$, wherein $0.8 \leq x \leq 1.2$, $0 \leq y \leq 0.2$, $0 < z \leq 0.5$, and M represents at least one metal element excluding Li, Ni, and Co; and a second lithium-transition metal composite oxide represented by the general formula $Li_aNi_{2-a-b}MebO_2$, wherein $0 < a \leq 0.5$, $0 \leq b \leq 0.5$, and Me represents at least one metal element excluding Li and Ni, and the non-aqueous electrolyte includes a sulfonylimide salt.

Advantageous Effect of Invention

The non-aqueous electrolyte secondary battery according to the present disclosure has excellent charge-discharge cycle characteristics.

DESCRIPTION OF EMBODIMENTS

As noted above, improvement of the charge-discharge cycle characteristics is an important challenge for the non-aqueous electrolyte secondary battery. Specifically, achievement of both of a higher capacity of the battery and good cycle characteristics is required. The present inventors have intensively investigated the improvement of the cycle characteristics, and consequently found that the cycle characteristics of the battery are specifically improved by using a positive electrode including a first lithium-transition metal composite oxide represented by the general formula $Li_xNi_{1-y-z}Co_yMzO_2$ and a second lithium-transition metal composite oxide represented by the general formula $Li_aNi_{2-a-b}Me_bO_2$, and a non-aqueous electrolyte including a sulfonylimide salt.

Although a mechanism of the improvement of the cycle characteristics by using the first lithium-transition metal composite oxide, the second lithium-transition metal composite oxide, and the sulfonylimide salt in combination is unclear, it is considered that the second lithium-transition metal composite oxide protects a surface of the first lithium-transition metal composite oxide to inhibit deterioration. In addition, it is considered that adding the sulfonylimide salt into the non-aqueous electrolyte forms a good protective coating on particle surfaces of the positive electrode active material, which inhibits a side reaction of the electrolyte on the particle surfaces, resulting in remarkable improvement of the cycle characteristics.

The first lithium-transition metal composite oxide contains Ni as an essential constituent, and a higher content of Ni facilitates achievement of both of the higher capacity and good cycle characteristics. The addition of the second lithium-transition metal composite oxide is more effective when the first lithium-transition metal composite oxide with a higher content of Ni is used.

Hereinafter, an example of an embodiment of the non-aqueous electrolyte secondary battery according to the present disclosure will be described in detail with reference to drawings. Note that, the present disclosure includes selectively combining a plurality of embodiments and modified examples described below.

Hereinafter, a cylindrical battery in which a wound electrode assembly 14 is housed in a bottomed cylindrical exterior housing can 16 will be exemplified, but the exterior of the battery is not limited to a cylindrical exterior housing can, and may be, for example, a rectangular exterior housing can (rectangular battery), a coin-shaped exterior housing can (coin-shaped battery), or an exterior composed of laminated sheets including a metal layer and a resin layer (laminated battery). The electrode assembly may be a stacked electrode assembly in which a plurality of positive electrodes and a plurality of negative electrodes are alternately stacked with a separator interposed therebetween.

Figure 1:
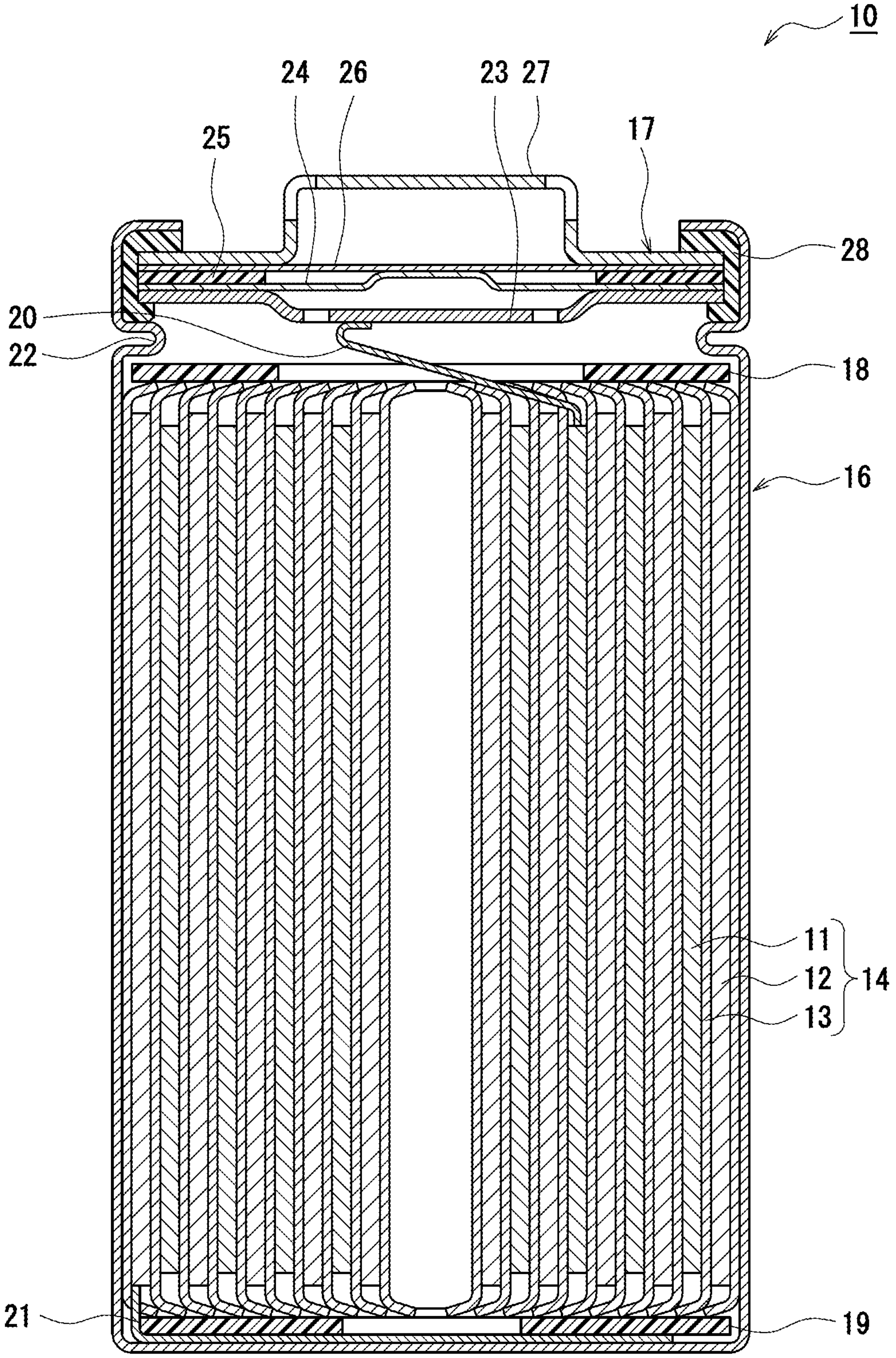
FIG. 1 is a sectional view of a non-aqueous electrolyte secondary battery of an example of an embodiment.

FIG. 1 is a view schematically illustrating a cross section of a non-aqueous electrolyte secondary battery 10 of an example of an embodiment. As illustrated in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening on one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The positive electrode 11, the negative electrode 12, and the separator 13, which constitute the electrode assembly 14, are all a band-shaped elongated body, and spirally wound to be alternately stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1 the positive electrode lead 20 extends through a through hole of the insulating plate 18 toward the sealing assembly 17 side, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

The exterior housing can 16 is a bottomed cylindrical metallic container having an opening on one side in an axial direction, as noted above. A gasket 28 is provided between the exterior housing can 16 and the sealing assembly 17, thereby sealability inside the battery and insulation between the exterior housing can 16 and the sealing assembly 17 are ensured. On the exterior housing can 16, a grooved portion 22 in which a part of a side wall thereof projects inward to support the sealing assembly 17 is formed. The grooved portion 22 is preferably formed in a circular shape along a circumferential direction of the exterior housing can 16, and supports the sealing assembly 17 with the upper face thereof. The sealing assembly 17 is fixed on the upper part of the exterior housing can 16 with the grooved portion 22 and with an end part of the opening of the exterior housing can 16 caulked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected at each of central parts thereof, and the insulating member 25 is interposed between each of the circumferential parts. If the internal pressure increases due to battery abnormality, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through an opening of the cap 27.

Figure 2:
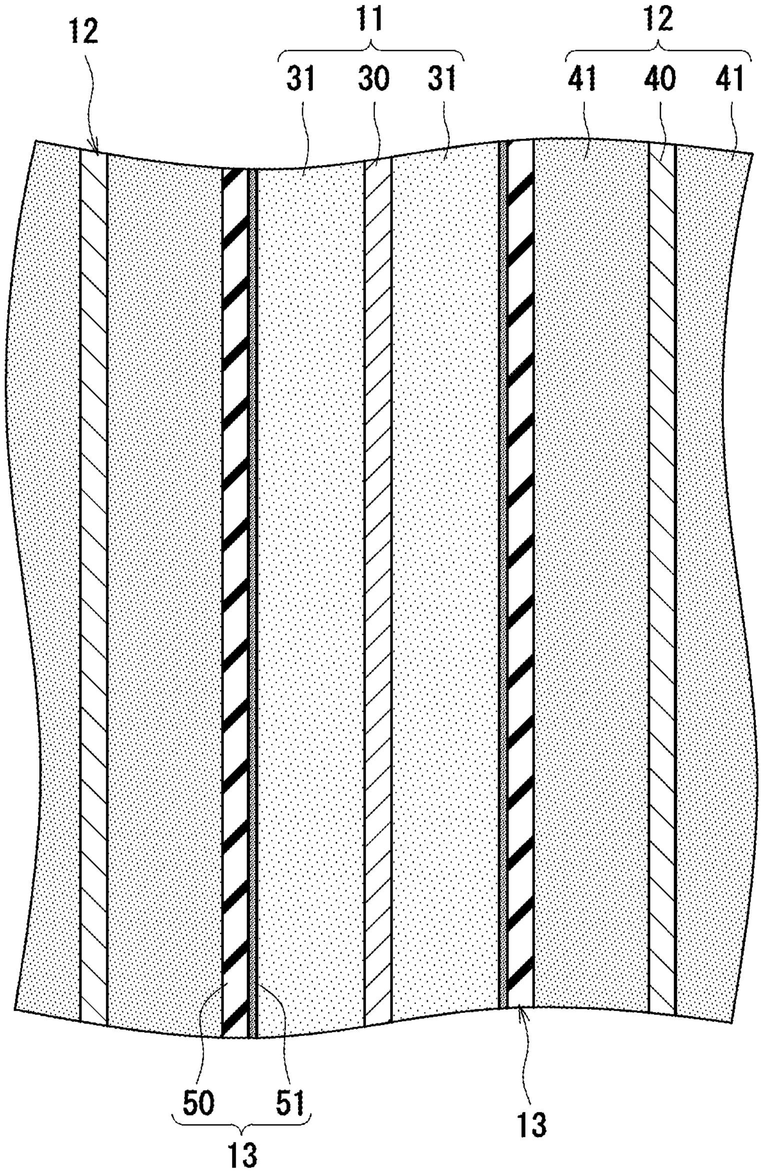
FIG. 2 is a view enlarging a part of a cross section of an electrode assembly of an example of an embodiment.

Hereinafter, the positive electrode 11, the negative electrode 12, the separator 13, and the non-aqueous electrolyte, which constitute the non-aqueous electrolyte secondary battery 10 will be described in detail with appropriately reference to FIG. 2. FIG. 2 is a schematic view enlarging and illustrating a part of a cross section of the electrode assembly 14.

<Positive Electrode>

As illustrated in FIG. 2, the positive electrode 11 has a positive electrode core 30 and a positive electrode mixture layer 31 formed on at least one surface of the positive electrode core 30. For the positive electrode core 30, a foil of a metal stable within a potential range of the positive electrode 11, such as aluminum and an aluminum alloy, a film in which such a metal is disposed on a surface layer thereof, and the like may be used. The positive electrode mixture layer 31 includes a positive electrode active material, a conductive agent, and a binder, and is preferably formed on both surfaces of the positive electrode core 30. For the positive electrode active material, a lithium-transition metal composite oxide is used. The positive electrode 11 may be manufactured by applying a positive electrode mixture slurry including the positive electrode active material, the conductive agent, the binder, and the like on the positive electrode core 30, and drying and subsequently compressing the coating to form the positive electrode mixture layers 31 on both the surfaces of the positive electrode core 30.

Examples of the binder included in the positive electrode mixture layer 31 include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethylcellulose (CMC) or a salt thereof, polyethylene oxide (PEO), and the like may be used in combination. A content of the binder is, for example, greater than or equal to 0.1 mass % and less than or equal to 5 mass %, or greater than or equal to 0.5 mass % and less than or equal to 3 mass %, relative to a total mass of the positive electrode mixture layer 31.

The positive electrode mixture layer 31 includes at least two kinds of lithium-transition metal composite oxides. A first lithium-transition metal composite oxide (hereinafter, referred to as "composite oxide (A)") is a composite oxide represented by the general formula $Li_xNi_{1-y-z}Co_yMzO_2$, wherein $0.8 \le x \le 1.2$, $0 \le y \le 0.2$, $0 < z \le 0.5$, and M represents at least one metal element excluding Li, Ni, and Co. A second lithium-transition metal composite oxide (hereinafter, referred to as "composite oxide (B)") is a composite oxide represented by the general formula $Li_aNi_{2-a-b}Me_bO_2$, wherein $0 < a \le 0.5$, $0 \le b \le 0.5$, and Me represents at least one metal element excluding Li and Ni.

In the positive electrode mixture layer 31, presence of both the composite oxides (A and B) specifically improves the charge-discharge cycle characteristics. The composite oxide (B) is considered to protect the particle surfaces of the composite oxide (A) to effectively inhibit deterioration of the particle surfaces, resulting in remarkable improvement of the cycle characteristics. In particular, it is considered that particles of the composite oxides (A and B) in contact with each other or via carbon nanotube (CNT) allows this protecting effect to effectively work. The composite oxide (B) may be mixed with the composite oxide (A) by application of a strong shearing force and compressive force and may be subjected to fixation treatment onto a surface of the composite oxide (A).

Although the composite oxide (B) exhibits the above effect at a small addition amount, there is a preferable range of the addition amount of the composite oxide (B) for attempting the improvement of the cycle characteristics while keeping the high battery capacity. The content of the composite oxide (B) is preferably greater than or equal to mass % and less than or equal to 10 mass %, more preferably greater than or equal to mass % and less than or equal to 7 mass %, or greater than or equal to 0.1 mass % and less than or equal to 5 mass %, relative to a total mass of the positive electrode mixture layer 31. Similarly, the content is preferably greater than or equal to 0.05 mass % and less than or equal to 10 mass %, more preferably greater than or equal to 0.1 mass % and less than or equal to 7 mass %, or greater than or equal to 0.1 mass % and less than or equal to 5 mass %, relative to a total mass of the positive electrode active material. The content of the composite oxide (B) within the above range may efficiently improve the cycle characteristics.

The positive electrode mixture layer 31 may include a composite oxide other than the composite oxides (A and B) (for example, a lithium-transition metal composite oxide not satisfying the above general formula) within a range not impairing an object of the present disclosure. The composite oxides (A and B) are preferably included at an amount of greater than or equal to 50 mass % relative to the total mass of the positive electrode mixture layer 31. The total content of the composite oxides (A and B) is, for example, greater than or equal to 85 mass %, greater than or equal to 90 mass %, or greater than or equal to 95 mass %, relative to the total mass of the positive electrode mixture layer 31. An example of the preferable content is greater than or equal to 90 mass % and less than or equal to 99 mass %, or greater than or equal to 95 mass % and less than or equal to 99 mass %.

[First Lithium-Transition Metal Composite Oxide (Composite Oxide (A))]

The composite oxide (A) is a composite oxide represented by the above general formula, and contains, as an essential element, at least one metal element M excluding Li, Ni, and Co. The composite oxide (A) preferably contains Co. Since Co is particularly rare and expensive, the composite oxide (A) may contain substantially no Co. When the composite oxide (A) contains Co, the Co content is less than or equal to 20 mol %, more preferably greater than or equal to 0.1 mol % and less than or equal to 10 mol %, or greater than or equal to 0.5 mol % and less than or equal to 5 mol %, relative to a total molar amount of metal elements excluding Li. Mole fractions of the metal elements in the composite oxide may be measured by inductively coupled plasma (ICP) atomic emission spectroscopy.

The composite oxide (A) preferably contains Ni with the most content among the metal elements excluding Li. The Ni content is preferably greater than or equal to 50 mol %, more preferably greater than or equal to 70 mol %, and particularly preferably greater than or equal to 80 mol %, relative to the total molar amount of the metal elements excluding Li. An example of the preferable Ni content is greater than or equal to 80 mol % and less than or equal to 97 mol %, or greater than or equal to 85 mol % and less than or equal to 95 mol %. That is, an example of preferable (1-y-z), which indicates the Ni content, in the above general formula is $0.80 \le (1\text{-}y\text{-}z)$ 0.97, or $0.85 \le (1\text{-}y\text{-}z) \le 0.95$.

An example of the preferable composite oxide (A) is, as noted above, a composite oxide containing Ni with greater than or equal to 80 mol % relative to the total molar amount of the metal elements excluding Li. Increasing a proportion of Ni in the metal elements in the composite oxide (A) may attempt to increase the battery capacity. The Ni-rich composite oxide (A) has good compatibility with the composite oxide (B), and is effective in terms of the improvement of the cycle characteristics. In the above general formula, "x", which indicates a Li content, is $0.8 \le x \le 1.2$ or $0.97 \le x \le 1.2$, and the composite oxide (A) may be a lithium-excess composite oxide, which has greater than 1 of a mole ratio of Li to the transition metals.

The composite oxide (A) contains at least one metal element M excluding Li, Ni, and Co. The metal element M is, for example, at least one selected from the group consisting of Mn, W, Mg, Mo, Nb Ti, Si, Al, Zr, B, Fe, Cu, Zn, Sn, Na, K, Ba, Sr, and Ca, and more preferably at least one selected from the group consisting of Mn, W, Mg, Mo, Nb, Ti, Si, Sr, Ca, and Al. Among them, at least one of Mn and Al is preferably contained. A content of the metal element M, a total content in a case of a plurality of the elements, is less than or equal to 50 mol %, more preferably greater than or equal to 0.1 mol % and less than or equal to 20 mol %, greater than or equal to 0.5 mol % and less than or equal to 10 mol %, or greater than or equal to 1 mol % and less than or equal to 5 mol %, relative to the total molar amount of the metal elements excluding Li.

The composite oxide (A) has, for example, a crystalline structure belonging to the space group R3-m. The composite oxide (A) has a layered structure including a transition metal layer, a Li layer, and an oxygen layer. In this case, the effect of protecting the composite oxide (B) more effectively works to maintain the stable crystalline structure even with repeated charges and discharges, which can improve the cycle characteristics more effectively. A BET specific surface area of the composite oxide (A) is, for example, greater than or equal to 0.2 $m^2/g$ and less than or equal to 2.0 $m^2/g$. The BET specific surface area is measured in accordance with a BET method (nitrogen adsorption method) described in JIS R1626.

The composite oxide (A) is of, for example, secondary particles formed by aggregation of a plurality of primary particles. An example of a median diameter (D50) on a volumetric basis of the composite oxide (A) is greater than or equal to 3 μm and less than or equal to 20 μm, or greater than or equal to 5 μm and less than or equal to 15 μm. The D50 means a particle diameter at which a cumulative frequency is 50% from a smaller particle diameter side in a particle size distribution on a volumetric basis. The particle size distribution of the secondary particles of the composite oxide may be measured by using a laser diffraction-type particle size distribution measuring device (for example, MT3000II, manufactured by MicrotracBEL Corp.) with water as a dispersion medium. The particle diameter of the primary particle of the composite oxide (A) is, for example, greater than or equal to 0.05 μm and less than or equal to 1 μm. The particle diameter of the primary particle is measured as a diameter of a circumscribed circle in a sectional image of the secondary particles observed with a scanning electron microscope (SEM).

Onto the particle surfaces of the composite oxide (A), a compound containing at least one selected from the group consisting of Sr, Ca, W, Mg, Nb, and Al (hereinafter, referred to as "metal element M2") may adhere. The M2 compound containing the metal element M2 may be scatteringly present on the particle surface of the composite oxide (A), or may be present as a layer so as to entirely cover the particle surface. A thickness of the layer of the M2 compound is, for example, greater than or equal to 0.1 nm and less than or equal to 5 nm. It is considered that the M2 compound protects the surface of the composite oxide (A) and also protects the surface of the composite oxide (B), which inhibits a side reaction of the electrolyte on the particle surfaces of the composite oxides (A and B).

The M2 compound is an oxide, a hydroxide, or a carbonate salt. Specific examples of the M2 compound include SrO, CaO, $Sr(OH)_2$, $Ca(OH)_2$, $SrCO_3$, and $CaCO_3$. An amount of the M2 compound is, for example, greater than or equal to 0.05 mol % and less than or equal to 0.5 mol % in terms of the metal element M2, relative to the total number of mole of the metal elements constituting the composite oxide (A) and excluding Li. The presence of the M2 compound may be confirmed by energy dispersive X-ray spectroscopy (TEM-EDX). The metal element M2 may be measured by ICP atomic emission spectroscopy of a solution of the composite oxide (A) dissolved in a nitric acid/hydrofluoric acid mixture.

The composite oxide (A) is manufactured by, for example, a first step of obtaining a composite oxide including Ni, the metal element M, and the like, a second step of mixing this composite oxide and a Li raw material to obtain a mixture, and a third step of calcining this mixture. When the M2 compound is adhered to the particle surface of the composite oxide (A), a raw material containing the metal element M2 (hereinafter, referred to as "M2 raw material") may be added in the second step. The composition, particle diameter, BET specific surface area, and the like of the composite oxide (A) and M2 compound may be regulated by controlling a mixing ratio of the raw materials, a calcining condition in the third step, and the like.

In the first step, for example, while stirring a solution of metal salts including the metal elements such as Ni and the metal element M, a solution of an alkali such as sodium hydroxide is added dropwise in order to adjust a pH to the alkaline side (for example, greater than or equal to 8.5 and less than or equal to 12.5) to precipitate (coprecipitate) a composite hydroxide including the metal elements. This composite hydroxide is then calcined to obtain a composite oxide including Ni, the metal element M, and the like. The calcining temperature is not particularly limited, and an example thereof is greater than or equal to 300° C. and less than or equal to 600° C.

In the second step, the composite oxide obtained in the first step, the Li raw material, and the M2 raw material, as necessary, are mixed to obtain a mixture. An example of the Li raw material is $Li_2CO_3$, LiOH, $Li_2O_2$, $Li_2O$, $LiNO_3$, $LiNO_2$, $Li_2SO_4$, $LiOH{\cdot}H_2O$, LiH, or LiF. An example of the M2 raw material is an oxide, hydroxide, carbonate salt, nitrate salt, or sulfate salt of M2. A mixing ratio between the composite oxide obtained in the first step and the Li raw material is regulated so that the mole ratio of the metal elements excluding Li:Li is greater than or equal to 1:0.98 and less than or equal to 1:1.22, for example. A mixing ratio between the composite oxide and the M2 raw material is regulated so that the mole ratio of the metal elements excluding Li:M2 is greater than or equal to 1:0.0005 and less than or equal to 1:0.005, for example.

In the third step, the mixture obtained in the second step is calcined at a predetermined temperature for a predetermined time to obtain a calcined product. The calcination of the mixture is, for example, performed by a multistep calcination including: a first calcining step of calcining the mixture in a calcination furnace under an oxygen flow to a first set temperature, which is greater than or equal to 450° C. and less than or equal to 680° C., at a first heating rate; and after the first calcining step, a second calcining step of calcining the calcined product in a calcination furnace under an oxygen flow to a second set temperature, which is greater than 680° C. and less than or equal to 800° C., at a second heating rate. The first heating rate is greater than or equal to 1.5° C./min and less than or equal to 5.5° C./min. The second heating rate, which is lower than the first heating rate, may be set to greater than or equal to 0.1° C./min and less than or equal to 3.5° C./min. A plurality of the heating rates may be set in each calcining step.

A holding time at the first set temperature in the first calcining step is, for example, greater than or equal to 0 hours and less than or equal to 5 hours, or greater than or equal to hours and less than or equal to 3 hours. The holding time at the set temperature refers to a time of maintaining the set temperature after the temperature reaches the set temperature. A holding time at the second set temperature in the second calcining step is, for example, greater than or equal to 1 hour and less than or equal to 10 hours, or greater than or equal to 1 hour and less than or equal to 5 hours. The calcination of the mixture is performed in an oxygen flow with an oxygen concentration of greater than or equal to 60%, and may be performed with a flow rate of the oxygen flow of greater than or equal to 0.2 mL/min and less than or equal to 4 mL/min per 10 $cm^3$ of the calcination furnace, and greater than or equal to 0.3 L/min per kilogram of the mixture. The calcined product may be washed with water, dehydrated, and dried to remove an impurity.

It is also acceptable that the M2 raw material is not added in the second step, that the M2 raw material is added in the third step during the washing of the calcined product with water or during the drying of the calcined product, and that a heat treatment is performed, for example, in a vacuum atmosphere at greater than or equal to 150° C. and less than or equal to 400° C. for greater than or equal to 0.5 hours and less than or equal to 15 hours to adhere the M2 compound onto the particle surface of the composite oxide (A).

[Second Lithium-Transition Metal Composite Oxide (Composite Oxide (B))]

The composite oxide (B) is, as noted above, a composite oxide represented by the general formula $Li_aNi_{2-a-b}Me_bO_2$, wherein $0<a\leq0.5$, $0\leq b\leq0.5$, and Me represents at least one metal element excluding Li and Ni. A content of the metal element Me is preferably lower than contents of Li and Ni, and for example, less than 10 mol % or less than 5 mol % relative to a total molar amount of the metal elements. An example of the metal element Me is at least one selected from the group consisting of Cu, Sr, Ca, Nb, Si, and Al.

The composite oxide (B) does not release nor occlude Li with the charge and discharge, and its composition does not change. Using such a composite oxide (B) with the composite oxide (A) in combination specifically improves the cycle characteristics of the battery. The composite oxide (B) may include a plurality of kinds of composite oxides having similar compositions. In the above general formula, "a" more preferably satisfies $0.1\leq a\leq0.5$ or $0.2\leq a\leq0.4$. "a" within the above range improves the cycle characteristics more effectively. The composition of the composite oxide (B) can be identified from an X-ray diffraction pattern, and can be analyzed by using ICP atomic emission spectroscopy.

The composite oxide (B) is, for example, a composite oxide having at least one diffraction peak having a peak top at a diffraction angle (2θ) of greater than or equal to 21.40° and less than or equal to 21.65° in a radiation X-ray diffraction (radiation energy 16 keV). This diffraction peak may be any peak as long as its peak top is within the range of 2θ of greater than or equal to 21.40° and less than or equal to 21.65°, and may be a broad peak that is not entirely present in this range. The X-ray diffraction pattern of the composite oxide (B) has, for example, one peak top within the range of 2θ of greater than or equal to 21.40° and less than or equal to 21.65°.

The X-ray diffraction pattern of the composite oxide (B) can be obtained by using synchrotron radiation facilities (beam line BL5S2 in Aichi Synchrotron Radiation Center) with a powder X-ray diffraction method under the following conditions.

Radiation energy; 16 keV

Scanning range; greater than or equal to 10° and less than or equal to 90°

Analytical optical system; Debye-Scherrer type

The obtained data is peak-searched with an identification analysis software PDXL (manufactured by Rigaku Corporation) to identify the composite oxide (B).

In the measurement with the above apparatus, NiO has a peak at 21.36°, and increasing "a" in the above general formula shifts the peak on a higher angle side. When "a" in the above general formula is within the above range, a main peak is in a range of greater than or equal to 21.40° and less than or equal to 21.65°. Collating the peaks including other peaks with a JCPDS card can identify the composite oxide (B).

The composite oxide (B) is of, for example, particles having a smaller particle diameter than the composite oxide (A), and a secondary particle formed by aggregation of a plurality of primary particles. An example of D50 of the composite oxide (B) is greater than or equal to 1 μm and less than or equal to 15 μm, greater than or equal to 1 μm and less than or equal to 10 μm, or greater than or equal to 2 μm and less than or equal to 7 μm. The D50 of the composite oxide (B) may be less than or equal to ½ of the D50 of the composite oxide (A), and is preferably greater than or equal to ⅕ and less than or equal to ½, or greater than or equal to ⅓ and less than or equal to ½, of the D50 of the composite oxide (A). Reducing the particle diameter of the composite oxide (B) relative to the particle diameter of the composite oxide (A) may yield a good contacting state of each particle, which enhances the effect of improving the cycle characteristics. A BET specific surface area of the composite oxide (B) is, for example, greater than or equal to 0.5 $m^2/g$ and less than or equal to 2.5 $m^2/g$.

In the positive electrode mixture layer 31, the composite oxide (B) is present, for example, in a state surrounded by a plurality of the composite oxides (A). The particle surfaces of the composite oxides (A and B) are contacted with each other. In this case, it is considered that the interaction between the composite oxides (A and B) is more effectively exhibited to enhance the effect of improving the cycle characteristics. The composite oxide (B) is not limited to those intentionally added, and may be a byproduct of the composite oxide (A) or those mixed as an impurity of other positive electrode materials.

The composite oxide (B) is manufactured by, for example: a first step of mixing predetermined amounts of a Li raw material and Ni raw material to obtain a mixture; and a second step of calcining this mixture at greater than or equal to 500° C. and less than or equal to 800° C. for greater than or equal to 10 hours and less than or equal to 30 hours. In the first step, the raw materials may be crushed, as necessary, and a raw material containing the metal element Me may be added within a range that the X-ray diffraction pattern of the composite oxide (B) satisfies the above condition. In the second step, the mixture may be formed into a pellet to be subjected to the calcination, and may be subjected to a disintegrating treatment after the calcination. The calcination in the second step is performed, for example, in the air or under an oxygen atmosphere.

An example of the Li raw material is $Li_2CO_3$, LiOH, $Li_7O_2$, $Li_2O$, $LiNO_3$, $LiNO_2$, $Li_2SO_4$, $LiOH\cdot H_2O$, LiH, LiF, or the like. An example of the Ni raw material is NiO, $Ni(OH)_2$, $NiCO_3$, $NiSO_4$, $Ni(NO_3)_2$, or the like. A mixing ratio between the Li raw material and the Ni raw material is regulated so that, for example, the X-ray diffraction pattern of the composite oxide (B) satisfies the above condition or "a" in the above general formula satisfies the condition of $0<a\leq0.5$.

[Conductive Agent]

The positive electrode mixture layer 31 includes the conductive agent, as noted above. The conductive agent forms a good conductive path in the positive electrode mixture layer 31 to contribute to reduction in a resistance of the positive electrode mixture layer 31. The positive electrode mixture layer 31 includes carbon nanotube (CNT) as the conductive agent. The positive electrode mixture layer 31 may include, in addition to CNT: particle conductive agents such as carbon black, acetylene black, Ketjenblack, and graphite; and fibrous conductive agents of conductive agents and the like such as vapor-grown carbon fiber (VGCF), electrospinning carbon fiber, polyacrylonitrile (PAN)-based carbon fiber, pitch-based carbon fiber, and graphene.

It is considered that CNT forms the good conductive path in the positive electrode mixture layer 31 and connects the particles of the composite oxides (A and B) with each other to enhance the surface-protecting effect by the composite oxide (B). The presence of both the composite oxide (B) and CNT specifically improves the cycle characteristics of the battery. A content of CNT is, for example, greater than or equal to 0.01 mass % and less than or equal to 5 mass %, more preferably greater than or equal to 0.04 mass % and less than or equal to 2 mass %, or greater than or equal to 0.06 mass % and less than or equal to 0.8 mass %, relative to the total mass of the positive electrode mixture layer 31. The content of CNT within the above range may efficiently improve the cycle characteristics. The positive electrode mixture layer 31 may include only CNT as the conductive agent.

CNT may be any of single wall CNT (SWCNT) and multiwall CNT (MWCNT). For MWCNT, CNT with a tubular structure in which graphene sheets composed of six-membered carbon rings are wound parallel to a fiber axis, CNT with a platelet structure in which graphene sheets composed of six-membered carbon rings are arranged perpendicular to a fiber axis, CNT with a herringbone structure in which graphene sheets composed of six-membered carbon rings are wound with oblique angle to a fiber axis, and the like may be used, for example. Into the positive electrode mixture layer 31, two or more kinds of CNT may be added.

An average diameter of CNT is, for example, less than or equal to 50 nm, preferably less than or equal to 40 nm, more preferably less than or equal to 25 nm, or less than or equal to 20 nm. A lower limit of the average diameter of CNT is not particularly limited, and an example thereof is 1 mu or 5 nm. An example of a preferable range of the average diameter of CNT is greater than or equal to 1 nm and less than or equal to 20 nm, or greater than or equal to 5 nm and less than or equal to 20 nm. The average diameter of CNT within the above range enhances the effect of improving the cycle characteristics compared with a case where CNT having an average diameter out of the above range is used.

An average fiber length of CNT is, for example, greater than or equal to 0.5 μm, preferably greater than or equal to 0.7 μm, more preferably greater than or equal to 0.8 μm, or greater than or equal to 1 μm. An upper limit of the average fiber length of CNT is not particularly limited, and an example thereof is 10 μm or 5 μm. An example of a preferable range of the average fiber length of CNT is greater than or equal to 1 μm and less than or equal to 10 μm, or greater than or equal to 1 μm and less than or equal to 5 μm. The average fiber length of CNT within the above range enhances the effect of improving the cycle characteristics compared with a case where CNT having an average fiber length out of the above range is used.

The average fiber length of CNT is shorter than a length corresponding to the D50 of the composite oxide (B), for example. The average diameter and average fiber length of CNT can be determined by measuring diameters and fiber lengths of 100 CNTs selected from a surface TEM image of the positive electrode mixture layer 31 and the sectional SEM image of the positive electrode mixture layer 31 to average these measured values, respectively.

<Negative Electrode>

As illustrated in FIG. 2, the negative electrode 12 has a negative electrode core 40 and a negative electrode mixture layer 41 formed on at least one surface of the negative electrode core 40. For the negative electrode core 40, a foil of a metal stable within a potential range of the negative electrode, such as copper and a copper alloy, a film in which such a metal is disposed on a surface layer thereof, and the like may be used. The negative electrode mixture layer 41 includes a negative electrode active material and a binder, and is preferably formed on both surfaces of the negative electrode core 40. To the negative electrode mixture layer 41, a conductive agent such as CNT may be added. The negative electrode 12 may be manufactured by applying a negative electrode mixture slurry including the negative electrode active material, the binder, and the like on the negative electrode core 40, and drying and subsequently compressing the coating to form the negative electrode mixture layers 41 on both the surfaces of the negative electrode core 40.

The negative electrode mixture layer 41 includes, as the negative electrode active material, a carbon-based active material, and at least one of at least one selected from the group consisting of Si, Sn, Sb, Mg, and Ge (hereinafter, referred to as "metal element M3") or an M3 compound containing the metal element M3. Contents of the metal element M3 and the M3 compound are, for example, greater than or equal to 0.5 mass % and less than or equal to 30 mass %, preferably greater than or equal to 1 mass % and less than or equal to 15 mass %, relative to a total mass of the negative electrode active material.

Into the negative electrode mixture layer 41, the metal element M3 may be added, but preferably the M3 compound is added. An example of the M3 compound is SiC, $SnO_2$, a first silicon material (SiO) containing a silicon oxide phase and Si dispersed in the silicon oxide phase, a second silicon material (LSX) containing a lithium silicate phase and Si dispersed in the lithium silicate phase, a third silicon material (Si—C) containing a carbon phase and Si dispersed in the carbon phase, or the like. Among them, SiO, LSX, or Si—C is preferable.

For the carbon-based active material, a natural graphite such as flake graphite and an artificial graphite such as massive artificial graphite and graphitized mesophase-carbon microbead are used, for example. A content of the carbon-based active material (graphite) is, for example, greater than or equal to 70 mass % and less than or equal to 99.5 mass %, or greater than or equal to 85 mass % and less than or equal to 99 mass %, relative to the mass of the negative electrode active material. An example of D50 of the carbon-based active material is greater than or equal to 1 μm and less than or equal to 20 μm, or greater than or equal to 2 μm and less than or equal to 15 μm. Using the carbon-based active material and the M3 compound in combination may attempt to increase the capacity while keeping the good cycle characteristics.

SiO and LSX are of, for example, particles having a smaller D50 than the D50 of graphite. An example of the D50 of SiO and LSX is greater than or equal to 1 μm and less than or equal to 15 μm or greater than or equal to 3 μm and less than or equal to 10 μm. On a particle surface of SiO and LSX, a conductive layer constituted with a highly conductive material may be formed. An example of the preferable conductive layer is a carbon coating constituted with a carbon material. A thickness of the conducive layer is preferably greater than or equal to 1 nm and less than or equal to 200 nm, or greater than or equal to 5 nm and less than or equal to 100 nm, considering ensuring the conductivity and diffusibility of lithium ions toward the particle inside.

SiO has a particle structure in which the fine Si particles are dispersed in the silicon oxide phase. A preferable SiO has a sea-island structure in which the fine Si particles are substantially uniformly dispersed in an amorphous silicon oxide matrix, and is represented by the general formula $SiO_x$ ($0<x\leq 2$). The silicon oxide phase is constituted with aggregation of finer particles than the Si particles. A content rate of Si particles is preferably greater than or equal to 35 mass % and less than or equal to 75 mass % relative to a total mass of SiO from the viewpoints of achievement of both the battery capacity and cycle characteristics, and the like.

An average particle diameter of the Si particles dispersed in the silicon oxide phase is, for example, less than or equal to 500 nm, preferably less than or equal to 200 nm, or less than or equal to 50 nm, before charge and discharge. After charge and discharge, the average particle diameter is, for example, less than or equal to 400 nm, or less than or equal to 100 nm. The average particle diameter of Si particles is determined by observing cross sections of the SiO particles by using an SEM or a transmission electron microscope (TEM) as an average value of longest diameters of 100 Si particles.

LSX has a particle structure in which the fine Si particles are dispersed in the lithium silicate phase. A preferable LSX has a sea-island structure in which the fine Si particles are substantially uniformly dispersed in a lithium silicate matrix. The lithium silicate phase is constituted with aggregation of finer particles than the Si particles. A content rate of the Si particles is, as in the case of SiO, preferably greater than or equal to mass % and less than or equal to 75 mass % relative to a total mass of LSX. An average particle diameter of the Si particles is, for example, less than or equal to 500 nm, preferably less than or equal to 200 nm, or less than or equal to 50 nm, before charge and discharge.

The lithium silicate phase is preferably constituted with a compound represented by the general formula $Li_{2z}SiO_{(2+z)}$ ($0<z<2$). That is, the lithium silicate phase does not include $Li_4SiO_4$ (Z=2). $Li_4SiO_4$, which is an unstable compound, reacts with water and exhibits alkalinity, and therefore may modify Si, resulting in deterioration of the charge-discharge capacity. The lithium silicate phase preferably contains $Li_2SiO_3$ (Z=1) or $Li_2Si_2O_5$ (Z=½) as a main component from the viewpoints of stability, production easiness, lithium ion conductivity, and the like. When $Li_2SiO_3$ or $Li_2Si_2O_5$ is a main component, a content of the main component is preferably greater than 50 mass %, and more preferably greater than or equal to 80 mass %, relative to a total mass of the lithium silicate phase.

Si—C has the carbon phase and the silicon particles dispersed in the carbon phase. A preferable content of the silicon particles in Si—C is preferably greater than or equal to 30 mass % and less than or equal to 80 mass %, preferably greater than or equal to 35 mass % and less than or equal to 75 mass %, and more preferably greater than or equal to 55 mass % and less than or equal to 70 mass %, in terms of increasing the capacity. A preferable average particle diameter of the silicon particles is typically less than or equal to 500 nm, preferably less than or equal to 200 nm, and more preferably less than or equal to 100 nm, before charge and discharge. After charge and discharge, the average particle diameter is preferably less than or equal to 400 nm, and more preferably less than or equal to 100 nm. The average particle diameter of the silicon particles is measured by observing cross sections of the Si—C particles using an SEM or a TEM. Specifically, the average particle diameter is determined as an average value of longest diameters of 100 silicone particles.

For the binder included in the negative electrode mixture layer 41, a fluororesin, PAN, a polyimide, an acrylic resin, a polyolefin, and the like may be used as in the case of the positive electrode 11, but styrene-butadiene rubber (SBR) is particularly preferably used. The negative electrode mixture layer 41 preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination. A content of the binder is, for example, greater than or equal to 0.1 mass % and less than or equal to 5 mass %, relative to the mass of the negative electrode active material.

<Separator>

As illustrated in FIG. 2, the separator 13 has a porous substrate 50 and a surface layer 51 formed on a surface facing the positive electrode 11 side in the surfaces of the substrate 50. The surface layer 51 is a layer including inorganic particles and a binder. The surface layer 51 may be formed on both the surfaces of the substrate 50, but preferably formed only on one surface, which faces the positive electrode 11 side, of the substrate 50 from the viewpoints of increasing the capacity and the like. The separator 13 is a porous sheet interposed between the positive electrode 11 and the negative electrode 12 to prevent electric contact between both the electrodes, and has an ion permeation property and an insulation property. A porosity of the separator 13 is, for example, greater than or equal to 30% and less than or equal to 70%. The porosity of the separator 13 is determined with a porosity of the substrate 50.

The substrate 50 is a porous sheet made of a resin. A thickness of the substrate 50 is, for example, greater than or equal to 5 μm and less than or equal to 50 μm, and more preferably greater than or equal to 10 μm and less than or equal to 30 μm. The resin constituting the substrate 50 is not particularly limited, and specific examples thereof include polyolefins such as polyethylene, polypropylene, and a copolymer of ethylene and an α-olefin, polyethylene terephthalate, polybutylene terephthalate, polyphenylene sulfide, a polyether ether ketone, a polyimide, a fluororesin, and cellulose. The substrate 50 may have a single layer structure, or may have a stacked structure such as three-layer structure of polyethylene/polypropylene/polyethylene.

The surface layer 51 is porous as in the substrate 50, and has an ion permeation property and an insulation property. A thickness of the surface layer Si is not particularly limited but preferably smaller than the thickness of the substrate 50, and for example, greater than or equal to 0.5 μm and less than or equal to 10 μm, and preferably greater than or equal to 1 μm and less than or equal to 6 μm. The surface layer 51 is contacted with the surface of the positive electrode mixture layer 31, and preferably formed on a substantial entirety of one surface of the substrate 50. The surface layer 51 may be formed by, for example: applying a slurry including the inorganic particles and the binder on an entirety of the surface of the substrate 50; and then drying the coating.

The surface layer 51 is a layer containing the inorganic particles as a main component. A content of the inorganic particles is, for example, greater than or equal to 70 mass %, and preferably greater than or equal to 80 mass %, relative to a total mass of the surface layer 51. A preferable range of the content of the inorganic particles is greater than or equal to 70 mass % and less than or equal to 99 mass %, greater than or equal to 80 mass % and less than or equal to 98 mass %, or greater than or equal to 85 mass % and less than or equal to 95 mass %. The surface layer 51 has a function of inhibiting damage of the separator 13 due to a conductive foreign matter, deformation of the separator 13 with abnormal heat generation, and the like. In addition, the surface layer 51 contacted with the positive electrode 11 is considered to inhibit the side reaction of the electrolyte in the positive electrode 11 with an interaction with the composite oxide (B), and providing the surface layer 51 specifically improves the cycle characteristics and storage characteristics of the battery.

Examples of the inorganic particles included in the surface layer 51 include particles of a metal oxide, metal nitride, metal fluoride, metal carbide, metal hydroxides such as aluminum hydroxide (boehmite) and magnesium hydroxide, metal carbonate salts such as calcium carbonate, magnesium carbonate, and barium carbonate, and metal sulfate salts such as calcium sulfate, magnesium sulfate, and barium sulfate. The inorganic particles may be used singly, or may be used in combination of two or more kinds thereof. D50 of the inorganic particles is, for example, greater than or equal to 0.01 μm and less than or equal to 10 μm, and preferably greater than or equal to 0.05 μm and less than or equal to 5 μm.

An example of the metal oxide is aluminum oxide (alumina), titanium oxide, magnesium oxide, zirconium oxide, nickel oxide, silicon oxide, manganese oxide, or the like. An example of the metal nitride is titanium nitride, boron nitride, aluminum nitride, magnesium nitride, silicon nitride, or the like. An example of the metal fluoride is aluminum fluoride, lithium fluoride, sodium fluoride, magnesium fluoride, calcium fluoride, barium fluoride, or the like. An example of the metal carbide is silicon carbide, boron carbide, titanium carbide, tungsten carbide, or the like. From the viewpoints of improvements of the cycle characteristics and storage characteristics, an example of the preferable inorganic particle is at least one selected from the group consisting of alumina, boehmite, and barium sulfate.

The binder included in the surface layer 51 is not particularly limited as long as it allows the inorganic particles to adhere to each other, it allows the inorganic particles to adhere to the substrate 50, and it has resistance against the electrolyte liquid. For example, those similar to the binder used for the positive electrode mixture layer 31 and the negative electrode mixture layer 41 may be used. Specific examples thereof include a fluororesin such as PVdF and PTFE, PAN, and an acrylic resin. A highly heat-resistant resin such as an aramid resin may also be used. An example of the preferable binder is at least one selected from the group consisting of an aramid resin and an acrylic resin.

[Non-Aqueous Electrolyte]

The non-aqueous electrolyte includes a non-aqueous solvent and an electrolyte salt dissolved in the non-aqueous solvent. For the non-aqueous solvent, esters, ethers, nitriles such as acetonitrile, amides such as dimethylformamide, a mixed solvent of two or more thereof, and the like may be used, for example. The non-aqueous solvent may contain a halogen-substituted derivative in which hydrogen of these solvents is at least partially replaced with a halogen atom such as fluorine. Examples of the halogen-substituted derivative include fluorinated cyclic carbonates such as fluoroethylene carbonate (FEC), fluorinated chain carbonates, and fluorinated chain carboxylates such as methyl fluoropropionate (FMP). The non-aqueous electrolyte is not limited to a liquid electrolyte, and may be a solid electrolyte.

The non-aqueous electrolyte includes a sulfonylimide salt as the electrolyte salt. In the non-aqueous electrolyte secondary battery 10 comprising the positive electrode 11 including the composite oxides (A and B), adding the sulfonylimide salt into the non-aqueous electrolyte is considered to form a good protective coating on the particle surface of the positive electrode active material, which inhibits the side reaction of the electrolyte on the particle surface, resulting in specific improvement of the cycle characteristics. A concentration of the sulfonylimide salt is preferably greater than or equal to 0.05 mol/L and less than or equal to 2.5 mol/L, more preferably greater than or equal to 0.1 mol/L and less than or equal to 2.0 mol/L, or greater than or equal to 0.1 mol/L and less than or equal to 1.5 mol/L. The content of the sulfonylimide salt within the above range can improve the cycle characteristics more effectively.

The sulfonylimide salt added into the non-aqueous electrolyte is preferably a lithium sulfonylimide. Examples of the lithium sulfonylimide include lithium bis(fluorosulfonyl)imide (LiFSI), lithium bis(trifluoromethanesulfonyl)imide, lithium bis(nonafluorobutanesulfonyl)imide, and lithium bis(pentafluoroethanesulfonyl)imide (LIBETI). Among them, at least one lithium sulfonylimide selected from the group consisting of LiFSI and lithium bis(trifluoromethanesulfonyl)imide is preferable. The sulfonylimide salt may be used singly, or may be used in combination of two or more kinds thereof.

The non-aqueous electrolyte may further contain another lithium salt. Examples of the other lithium salt include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ ($1<x<6$, and "n" represents 1 or 2), $LiB_{10}Cl_{10}$, LiCl, LiBr, LiI, lithium chloroborane, a lithium lower aliphatic carboxylate, and borate salts such as $Li_2B_4O_7$ and $Li(B(C_2O_4)F_2)$. Among them, $LiPF_6$ is preferably used from the viewpoints of ion conductivity, electrochemical stability, and the like.

In the non-aqueous electrolyte, both of the lithium sulfonylimide and a second lithium salt are preferably present. In this case, a combination of LiFSI and $LiPF_6$ is particularly preferable. The concentration of the lithium sulfonylimide is regulated within, for example, the above range even when the second lithium salt is included. As a specific example, the concentration of lithium sulfonylimide is greater than or equal to 0.1 mol/L and less than or equal to 1.5 mol/L, and a total concentration of the lithium salts is greater than or equal to 1.5 mol/L and less than or equal to 2.5 mol/L. The concentration of the lithium sulfonylimide is, for example, greater than or equal to 30% and less than or equal to 70% of the concentration of the lithium salts included in the non-aqueous electrolyte.

The non-aqueous electrolyte may contain additives such as vinylene carbonate (VC), ethylene sulfite (ES), cyclohexylbenzene (CHB), orthoterphenyl (OTP), and a propanesultone-based compound. Among them, VC is preferably added from the viewpoints of increasing the capacity and the like. A concentration of the additives is not particularly limited, and an example thereof is greater than or equal to 0.1 mass % and less than or equal to 5 mass %.

For the non-aqueous solvent, esters and ethers are used, as noted above. Examples of the esters include: cyclic carbonates such as ethylene carbonate (EC), propylene carbonate (PC), and butylene carbonate; chain carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone (GBL) and γ-valerolactone (GVL); and chain carboxylates such as methyl acetate, ethyl acetate, propyl acetate, methyl propionate (MP), and ethyl propionate (EP).

Examples of the ethers include: cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and a crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

(Modified Examples)

Onto the particle surface of the composite oxide (A), another compound such as a lanthanoid-containing compound may adhere instead of the compound containing the metal element M2. Alternatively, onto the particle surface of the composite oxide (A), substantially no material may adhere. On the particle surface of the composite oxide (A), the composite oxide (B) having a smaller particle diameter may adhere.

In the positive electrode mixture layer, CNT may not be included, and as the conductive agent, carbon black, acetylene black, Ketjenblack, graphite, and the like may not be included. In the negative electrode mixture layer, the metal element M3 and the M3 compound may not be included, and as the negative electrode active material, only the carbon-based active material such as graphite may be included.

The separator may be a porous sheet having no surface layer containing the inorganic particles as a main component. Alternatively, on the surface of the positive electrode mixture layer, a surface layer containing the inorganic particles as the main component may be provided.

EXAMPLES

Hereinafter, the present disclosure will be further described with Examples, but the present disclosure is not limited to these Examples.

Example 1

[Synthesis of Composite Oxide (A1)]

A composite hydroxide obtained by a coprecipitation method and represented by $[Ni_{0.91}Co_{0.04}Al_{0.05}](OH)_2$ was calcined at 500° C. for 8 hours to obtain a composite oxide ($Ni_{0.91}Co_{0.04}Al_{0.05}O_2$) (the first step). Then, lithium hydroxide (LiOH) and the composite oxide were mixed so that a mole ratio between Li and a total of Ni, Co, and Al was 1.02:1 to obtain a mixture. This mixture was calcined under an oxygen flow with an oxygen concentration of 95% (a flow rate of 2 mL/min per 10 $cm^3$ and 5 L/min per kilogram of the mixture) at a heating rate of 2° C./min from room temperature to 650° C., and then calcined at a heating rate of 0.5° C./min from 650° C. to 720° C. This calcined product was washed with water and an impurity was removed to obtain a composite oxide (A1).

ICP analysis demonstrated that the composite oxide (A1) had a composition of $LiNi_{0.91}Co_{0.04}Al_{0.05}O_2$. An X-ray diffraction method identified that a crystalline structure of the first lithium-transition metal composite oxide belonged to the space group R-3m. D50 of the composite oxide (A1) measured by using MT3000II, manufactured by MicrotracBEL Corp., with water as a dispersion medium was 10 μm.

[Synthesis of Composite Oxide (B1)]

$Li_2O$ and NiO were weighed so that a mole ratio between Li and Ni was 0.3:1.7, and these were crushed and mixed to produce a mixture. Then, this mixture was calcined under an oxygen atmosphere at 650° C. for 20 hours, and further disintegrated to obtain a composite oxide (B1). A powder X-ray diffraction measurement on the composite oxide (B1) was performed by using the above radiation facilities, and confirmed was one peak having its peak top at 21.48° within a range of 2θ=greater than or equal to 21.40° and less than or equal to 21.65° of the obtained X-ray diffraction pattern. Collating the peak including other peaks with the JCPDS card confirmed that the composition of the composite oxide (B1) was $Li_{0.3}Ni_{1.7}O_2$. D50 of the composite oxide (B1) measured by using MT3000II, manufactured by MicrotracBEL Corp., with water as a dispersion medium was 5 μm.

[Production of Positive Electrode]

The composite oxides (A1 and B1) were mixed at a mass ratio of 99.9:0.1 to use as a positive electrode active material. The positive electrode active material, acetylene black (AB), and polyvinylidene fluoride (PVdF) were mixed at a solid content mass ratio of 92:5:3, to the mixture was added an appropriate amount of N-methylpyrrolidone (NMP), and then the mixture was kneaded to prepare a positive electrode mixture slurry. This positive electrode mixture slurry was applied on a positive electrode core made of aluminum foil, the coating was dried and then rolled by using a roller, and cut to a predetermined electrode size to obtain a positive electrode in which positive electrode mixture layers were formed on both surfaces of the positive electrode core. On a part of the positive electrode, an exposed portion where a surface of the positive electrode current collector was exposed was provided.

[Production of Negative Electrode]

As a negative electrode active material, graphite and SiO represented by $SiO_x$ (X=1.0) were mixed at a mass ratio of 95:5 to use. The negative electrode active material, a dispersion of styrene-butadiene rubber (SBR), and sodium carboxymethylcellulose (CMC—Na) were mixed at a solid content mass ratio of 98:1:1, and water was used as a dispersion medium to prepare a negative electrode mixture slurry. Then, this negative electrode mixture slurry was applied on both surfaces of a negative electrode core made of copper foil, the coating was dried and compressed, and then cut to a predetermined electrode size to produce a negative electrode in which negative electrode mixture layers were formed on both surfaces of the negative electrode core.

[Preparation of Non-Aqueous Electrolyte]

Into a mixed solvent in which ethylene carbonate (EC) and ethyl methyl carbonate (EMC) were mixed at a volume ratio of 3:7 (at 25° C., 1 atm), LiFSI was dissolved at a concentration of 0.5 mol/L and $LiPF_6$ was dissolved at a concentration of 1.0 mol/L to prepare a non-aqueous electrolyte.

[Production of Test Cell]

The positive electrode to which a positive electrode lead made of aluminum was attached and the negative electrode to which a negative electrode lead made of nickel was attached were spirally wound with a separator made of polyethylene interposed therebetween, and flatly formed to produce a wound electrode assembly. This electrode assembly was housed in an exterior constituted with an aluminum laminate, the non-aqueous electrolyte liquid was injected thereinto, and an opening of the exterior was sealed to produce a test cell for evaluation.

Example 2

A test cell was produced in the same manner as in Example 1 except that, in the production of the positive electrode, the composite oxides (A1 and B1) were mixed at a mass ratio of 99.8:0.2.

Example 3

A test cell was produced in the same manner as in Example 1 except that, in the production of the positive electrode, the composite oxides (A1 and B1) were mixed at a mass ratio of 99.7:0.3.

Example 4

A test cell was produced in the same manner as in Example 2 except that, in the preparation of the non-aqueous electrolyte, LiFSI was dissolved at a concentration of 1.0 mol/L and $LiPF_6$ was dissolved at a concentration of 0.5 mol/L.

Example 5

A test cell was produced in the same manner as in Example 2 except that $Li_2O$ and NiO were mixed so that a mole ratio between Li and Ni was 0.2:1.8 to synthesize a composite oxide (B2).

Example 6

A test cell was produced in the same manner as in Example 2 except that $Li_2O$ and NiO were mixed so that a mole ratio between Li and Ni was 0.5:1.5 to synthesize a composite oxide (B3).

Comparative Example 1

A test cell was produced in the same manner as in Example 4 except that, in the production of the positive electrode, the composite oxide (B1) was not used.

Comparative Example 2

A test cell was produced in the same manner as in Comparative Example 1 except that, in the preparation of the non-aqueous electrolyte, LiFSI was dissolved at a concentration of 0.5 mol/L and $LiPF_6$ was dissolved at a concentration of 1.0 mol/L.

Comparative Example 3

A test cell was produced in the same manner as in Example 2 except that, in the preparation of the non-aqueous electrolyte, LiFSI was not used and $LiPF_6$ was dissolved at a concentration of 1.5 mol/L.

Comparative Example 4

A test cell was produced in the same manner as in Comparative Example 1 except that, in the preparation of the non-aqueous electrolyte, LiFSI was not used and $LiPF_6$ was dissolved at a concentration of 1.5 mol/L.

Comparative Example 5

A test cell was produced in the same manner as in Example 2 except that, in the production of the positive electrode, the following composite oxide (B10) was used instead of the composite oxide (B1).

[Synthesis of Composite Oxide (B10)]

$Li_2O$ and NiO were weighed so that a mole ratio between Li and Ni was 0.7:1.3, and these were crushed and mixed to produce a mixture. Then, this mixture was calcined under an oxygen atmosphere at 650° C. for 20 hours, and further disintegrated to obtain the composite oxide (B10).

Charge-discharge cycle characteristics of each of the test cells of Examples and Comparative Examples were evaluated by the following method. Table 1 shows the evaluation results together with the constitutions of the positive electrode and non-aqueous electrolyte.

[Evaluation of Cycle Characteristics (Capacity Maintenance Rate)]

Under a temperature environment at 40° C., the test cell was charged at a constant current of 0.3 C until a battery voltage reached 4.3 V, and charged at a constant voltage of 4.3 V until a current value reached 0.02 C. Thereafter, the test cell was discharged at a constant current of 0.05 C until the battery voltage reached 2.5 V. This charge and discharge were performed with 30 cycles, and a capacity maintenance rate after the 30 cycles was determined based on the following formula. The capacity maintenance rate shown in Table 1 is a value relative to a capacity maintenance rate of the test cell of Comparative Example 4 as a standard (100).

Capacity Maintenance Rate=(Discharge Capacity at 30th Cycle/Discharge Capacity at 1st Cycle)×100

TABLE 1

| | Positive electrode | | | | Non-aqueous electrolyte | |
|---|---|---|---|---|---|---|
| | Composite oxide A | Composite oxide B $Li_aNi_{2-a}O_2$ | Value of "a" | Position of peak top 2θ | LiFSI (mol/L) | Capacity maintenance rate |
| Example 1 | 99.9 wt % | 0.1 wt % | 0.3 | 21.48° | 0.5 | 103 |
| Example 2 | 99.8 wt % | 0.2 wt % | 0.3 | 21.48° | 0.5 | 104 |
| Example 3 | 99.7 wt % | 0.3 wt % | 0.3 | 21.48° | 0.5 | 106 |
| Example 4 | 99.8 wt % | 0.2 wt % | 0.3 | 21.48° | 1.0 | 108 |
| Example 5 | 99.8 wt % | 0.2 wt % | 0.2 | 21.43° | 0.5 | 107 |
| Example 6 | 99.8 wt % | 0.2 wt % | 0.5 | 21.60° | 0.5 | 106 |
| Comparative Example 1 | 100 wt % | — | — | — | 1.0 | 102 |
| Comparative Example 2 | 100 wt % | — | — | — | 0.5 | 101 |
| Comparative Example 3 | 99.8 wt % | 0.2 wt % | 0.3 | 21.48° | — | 101 |
| Comparative Example 4 | 100 wt % | — | — | — | — | 100 |
| Comparative Example 5 | 99.8 wt % | 0.2 wt % | 0.7 | 21.73° | 0.5 | 99 |

As understood from the results shown in Table 1, any of the test cells of Examples have a higher capacity maintenance rate and excellent cycle characteristics compared with the test cells of Comparative Examples. That is, when the positive electrode including the composite oxide (Al) and the composite oxide (B1 to B3) represented by the general formula $Li_aNi_{2-a-b}Me_bO_2$, wherein $0<a\leq0.5$, $0\leq b\leq0.5$, and Me represents at least one metal element excluding Li and Ni, and the non-aqueous electrolyte containing the added LiFSI are used, the specific improvement of the cycle characteristics is observed.

When the composite oxide (A1) is used singly as the positive electrode active material (Comparative Examples 1, 2, and 4), when LiFSI is not added into the non-aqueous electrolyte (Comparative Examples 3 and 4), and when the composite oxide (B10) not satisfying the condition of the above general formula is used instead of the composite oxides (B1 to B3) (Comparative Example 5), the effect of improving the cycle characteristics like Examples is all not obtained.

REFERENCE SIGNS LIST

10 Non-aqueous electrolyte secondary battery, 11 Positive electrode, 12 Negative electrode, 13 Separator, 14 Electrode assembly, 16 Exterior housing can, 17 Sealing assembly, 18, 19 Insulating plate, 20 Positive electrode lead, 21 Negative electrode lead, 22 Grooved portion, 23 Internal terminal plate, 24 Lower vent member, 25 Insulating member, 26 Upper vent member, 27 Cap, 28 Gasket, 30 Positive electrode core, 31 Positive electrode mixture layer, 40 Negative electrode core, 41 Negative electrode mixture layer, 50 Substrate, 51 Surface layer

The invention claimed is:

1. A non-aqueous electrolyte secondary battery, comprising:

a positive electrode having a positive electrode mixture layer;

a negative electrode; and a non-aqueous electrolyte, wherein the positive electrode mixture layer includes:

a first lithium-transition metal composite oxide represented by the general formula $Li_xNi_{1-y-z}Co_yM_zO_2$, wherein $0.8\leq x\leq1.2$, $0\leq y\leq0.2$, $0<z\leq0.5$, and M represents at least one metal element excluding Li, Ni, and Co; and a second lithium-transition metal composite oxide represented by the general formula $Li_aNi_{2-a}O_2$, wherein $0<a\leq0.5$, a content of the second lithium-transition metal composite oxide is greater than or equal to 0.1 mass % and less than or equal to 10 mass % relative to a total mass of the positive electrode mixture layer, a total content of the first lithium-transition metal composite oxide and the second lithium-transition metal composite oxides is greater than or equal to 90 mass % and less than or equal to 99 mass % relative to the total mass of the positive electrode mixture layer, and the non-aqueous electrolyte includes a sulfonylimide salt.

2. The non-aqueous electrolyte secondary battery according to claim 1, wherein the second lithium-transition metal composite oxide is a composite oxide having at least one diffraction peak having a peak top at a diffraction angle (2θ) of greater than or equal to 21.40° and less than or equal to 21.65° in a radiation X-ray diffraction (radiation energy 16 keV).

3. The non-aqueous electrolyte secondary battery according to claim 1, wherein the sulfonylimide salt is at least one lithium sulfonylimide selected from the group consisting of lithium bis(fluorosulfonyl)imide and lithium bis(trifluoromethanesulfonyl)imide.

4. The non-aqueous electrolyte secondary battery according to claim 1, wherein the sulfonylimide salt is contained in the non-aqueous electrolyte at a concentration of greater than or equal to 0.1 mol/L and less than or equal to 1.5 mol/L.

5. The non-aqueous electrolyte secondary battery according to claim 1, wherein the negative electrode includes, as a negative electrode active material, a carbon-based active material, and a second active material that is at least one of at least one metal element selected from the group consisting of Si, Sn, Sb, Mg, and Ge or a compound containing the metal element, and a content of the second active material is greater than or equal to 1 mass % and less than or equal to 15 mass % relative to a total mass of the negative electrode active material.

* * * * *